(12) United States Patent
Kfir et al.

(10) Patent No.: US 10,148,571 B2
(45) Date of Patent: Dec. 4, 2018

(54) JUMP ON A MATCH OPTIMIZATION FOR LONGEST PREFIX MATCH USING A BINARY SEARCH TREE

(71) Applicant: Mellanox Technologies TLV Ltd., Raanana (IL)

(72) Inventors: Aviv Kfir, Nili (IL); Pedro Reviriego, Madrid (ES); Salvatore Pontarelli, Rome (IT); Gil Levy, Hod Hasharon (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 121 days.

(21) Appl. No.: 15/186,562

(22) Filed: Jun. 20, 2016

(65) Prior Publication Data

US 2017/0366459 A1    Dec. 21, 2017

(51) Int. Cl.
*H04L 12/745* (2013.01)
*H04L 12/753* (2013.01)

(52) U.S. Cl.
CPC ............ *H04L 45/748* (2013.01); *H04L 45/48* (2013.01)

(58) Field of Classification Search
CPC ......... H04L 45/00; H04L 45/04; H04L 45/48; H04L 45/745; H04L 45/748; H04L 45/7457; H04L 45/54
See application file for complete search history.

(56) References Cited

U.S. PATENT DOCUMENTS

| | | | |
|---|---|---|---|
| 2001/0028651 A1 | 10/2001 | Murase | |
| 2009/0077076 A1* | 3/2009 | Berger | .............. G06F 17/30327 |
| 2010/0080223 A1 | 4/2010 | Wong et al. | |
| 2015/0098470 A1 | 4/2015 | Sun et al. | |

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.
Kasnavi et al., "A cache-based Internet protocol address lookup architecture", Computer Networks, vol. 52, pp. 303-326, year 2008.
Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.
Kohler et al., "Observed Structure of Addresses in IP Traffic", IEEE/ACM Transactions on Networking, vol. 14, No. 6, pp. 1207-1218, Dec. 2006.

(Continued)

*Primary Examiner* — Peter Chen
(74) *Attorney, Agent, or Firm* — D. Kligler IP Services Ltd.

(57) ABSTRACT

A routing table is represented as a binary search tree ordered by prefix lengths. Markers are placed to guide accessing nodes in designated subtrees to search for a longest prefix match with destination addresses of data packet. Destination descendant nodes in remote hierarchical levels of the tree are associated with the markers. The traversal of the binary search tree is conducted by accessing the respective destination descendant nodes while avoiding accessing nodes in intermediate hierarchical levels. The packet is processed using the longest prefix match.

17 Claims, 5 Drawing Sheets

(56) References Cited

OTHER PUBLICATIONS

Liu et al., "Efficient FIB Caching using Minimal Non-overlapping Prefixes", ACM SIGCOMM Computer Communication Review, vol. 43, No. 1, pp. 15-21, Jan. 2013.
Sarrar et al., "Leveraging Zipf's Law for Traffic Offloading", ACM SIGCOMM Computer Communication Review, vol. 42, No. 1, pp. 17-22, Jan. 2012.
WAND Network Research Group, 7 pages, Apr. 22, 2010 (downloaded from http://wand.net.nz/wits/catalogue.php).
The CAIDA Anonymized Internet Traces 2014 Dataset, 2 pages, 2014 https://www.caida.org/data/passive/passive_2014_dataset.xml.
Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.
Kravchik et al., U.S. Appl. No. 15/186,477, filed Jun. 19, 2016.
EP Application # 17176740.3 search report dated Oct. 5, 2017.

* cited by examiner

JUMP ON A MATCH OPTIMIZATION FOR LONGEST PREFIX MATCH USING A BINARY SEARCH TREE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information. More particularly, this invention relates to operations in the routing of packets in data switching networks.

2. Description of the Related Art

The meanings of certain acronyms and abbreviations used herein are given in Table 1.

TABLE 1

Acronyms and Abbreviations

| | |
|---|---|
| BST | Binary Search Tree |
| DIP | Destination Internet Protocol Address |
| DRAM | Dynamic Random Access Memory |
| HCA | Host Channel Adapter |
| IP | Internet Protocol |
| LPM | Longest Prefix Match |
| MSB | Most Signficant Bits |
| NIC | Network Interface Card |
| RIF | Router Interface |
| SRAM | Static Random Access Memory |
| TCAM | Ternary Content Addressable Memory |

Modern internet routers determine data routing based on searching for a packet destination IP address (DIP) in a database of forwarding information known as a routing table. The routing table, rather than storing a full DIP, stores only some of the leading portion, known as a prefix. The prefix comprises some number of the most significant bits of the DIP. The remaining bits are treated as "don't care" bits for purpose of a DIP search in the routing table. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the table entry. This entry is selected to route the packet.

Searching the routing table for the LPM is a bottleneck in routing throughput. Implementing LPM is challenging as the destination IP (DIP) of each incoming packet has to be compared against the entries of the routing table, which can be very large, for example more than 500k entries, to find the best (longest) prefix match. Various hardware-based solutions have been proposed. However, the circuitry required to implement such solutions becomes complex. Moreover, the increasing amount of internet traffic and demands for reduced latency have resulted in relatively costly router circuitry having high power consumption and heat dissipation.

One method that implements a longest prefix match in a routing table involves constructing a binary search tree on prefix lengths with markers, as proposed in the document *Scalable High-Speed Prefix Matching*, Waldvogel et al (1997), in *Proceedings of the ACM SIGCOMM '97 conference on applications, technologies, architectures, and protocols for computer communication*, pp 25-36, which is herein incorporated by reference. It can determine the LPM in a worst case of five hash lookups for IPv4 and of seven for IPv6. The method requires addition of new entries called markers in the tree to ensure that the correct result is obtained for all the packets. When there is a match on a given node of the tree, that information can be used to narrow down the search. Moreover, on a match, the tree is mutated to a new tree that takes into account the information provided by the match. Although the mutation is optimal to reduce the number of accesses to complete the search, it is complex to implement in hardware.

SUMMARY OF THE INVENTION

Embodiments of the invention provide an optimization of the solution described in the above-noted Waldvogel paper that can be easily implemented in hardware. The search jumps on a match to the next level of the tree that needs to be checked, thus reducing both the number of accesses and the number of markers. The jump captures most of the benefits that can be extracted from information provided by a match.

There is provided according to embodiments of the invention a method, which is carried out by representing a routing table for a data network as a binary search tree of address prefixes ordered by prefix lengths. The binary search tree has two subtrees of nodes including parent nodes and descendant nodes disposed in hierarchical levels of the subtrees. The method is further carried out by placing markers in the parent nodes to guide accessing the descendant nodes in the subtrees to search for a destination address of a data packet, associating destination descendant nodes with the markers, wherein the destination descendant nodes are separated from the parent nodes by at least one intermediate hierarchical level, and traversing the binary search tree to determine a longest prefix match between the markers and the destination address. The traversal of the binary search tree is conducted by accessing the respective destination descendant nodes while avoiding accessing nodes in at least one intermediate hierarchical level. The method is further carried out by processing the packet in the data network in accordance with an entry in the routing table that corresponds to the longest prefix match.

According to one aspect of the method, traversing the binary search tree includes accessing one of the subtrees of the nodes when markers are present and accessing another of the subtrees of the nodes when the markers are absent.

According to another aspect of the method accessing the destination descendant nodes comprises performing hash lookups.

According to a further aspect of the method, associating destination descendant nodes includes making a first determination that compatible descendant nodes in a selected subtree comprise address prefixes that are compatible with the marker of one of the parent nodes, making a second determination that one of the compatible descendant nodes has additional compatible descendant nodes in each of the two subtrees thereof, and responsively to the second determination assigning the one compatible descendant node as the destination descendant node.

According to another aspect of the method, associating destination descendant nodes includes making a first determination that compatible descendant nodes in a selected subtree comprise address prefixes are compatible with the marker of one of the parent nodes, and making a second determination that one of the compatible descendant nodes is a compatible leaf node, and responsively to the second determination assigning the compatible leaf node as the destination descendant node.

According to yet another aspect of the method, the markers in the nodes comprise an indication that longer compatible prefixes exist in one of the subtrees thereof.

According to still another aspect of the method, the markers in the nodes comprise an indication that no longer compatible prefixes exist in one of the subtrees thereof.

According to an additional aspect of the method, at least a portion of the nodes comprise a plurality of markers.

There is further provided according to embodiments of the invention an apparatus, including a network element, which is operative for receiving a packet via a data network, a processor in the network element and a main memory storing a routing table of packet forwarding information. The processor is operative for performing a method comprising the steps of representing a routing table for a data network as a binary search tree of address prefixes ordered by prefix lengths. The binary search tree has two subtrees of nodes including parent nodes and descendant nodes disposed in hierarchical levels of the subtrees. The method is further carried out by placing markers in the parent nodes to guide accessing the descendant nodes in the subtrees to search for a destination address of a data packet, associating destination descendant nodes with the markers, wherein the destination descendant nodes are separated from the parent nodes by at least one intermediate hierarchical level, and traversing the binary search tree to determine a longest prefix match between the markers and the destination address. The traversal of the binary search tree is conducted by accessing the respective destination descendant nodes while avoiding accessing nodes in at least one intermediate hierarchical level. The method is further carried out by processing the packet in the data network in accordance with an entry in the routing table that corresponds to the longest prefix match.

There is further provided according to embodiments of the invention a computer software product adapted to a network element, including a non-transitory computer-readable storage medium in which computer program instructions are stored, which instructions, when executed by a computer, cause the computer to perform a method comprising the steps of representing a routing table for a data network as a binary search tree of address prefixes ordered by prefix lengths. The binary search tree has two subtrees of nodes including parent nodes and descendant nodes disposed in hierarchical levels of the subtrees. The method is further carried out by placing markers in the parent nodes to guide accessing the descendant nodes in the subtrees to search for a destination address of a data packet, associating destination descendant nodes with the markers, wherein the destination descendant nodes are separated from the parent nodes by at least one intermediate hierarchical level, and traversing the binary search tree to determine a longest prefix match between the markers and the destination address. The traversal of the binary search tree is conducted by accessing the respective destination descendant nodes while avoiding accessing nodes in at least one intermediate hierarchical level. The method is further carried out by processing the packet in the data network in accordance with an entry in the routing table that corresponds to the longest prefix match.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions.

Most Significant Bit. In a binary number the most significant bit (MSB) is the bit position having the greatest value.

Most Significant Bits. In a binary number the most significant bits are the bits closest to and including the MSB.

A prefix is compatible with another shorter prefix when it has the same MSBs as all unmasked bits of the shorter prefix.

System Overview.

Figure 1:
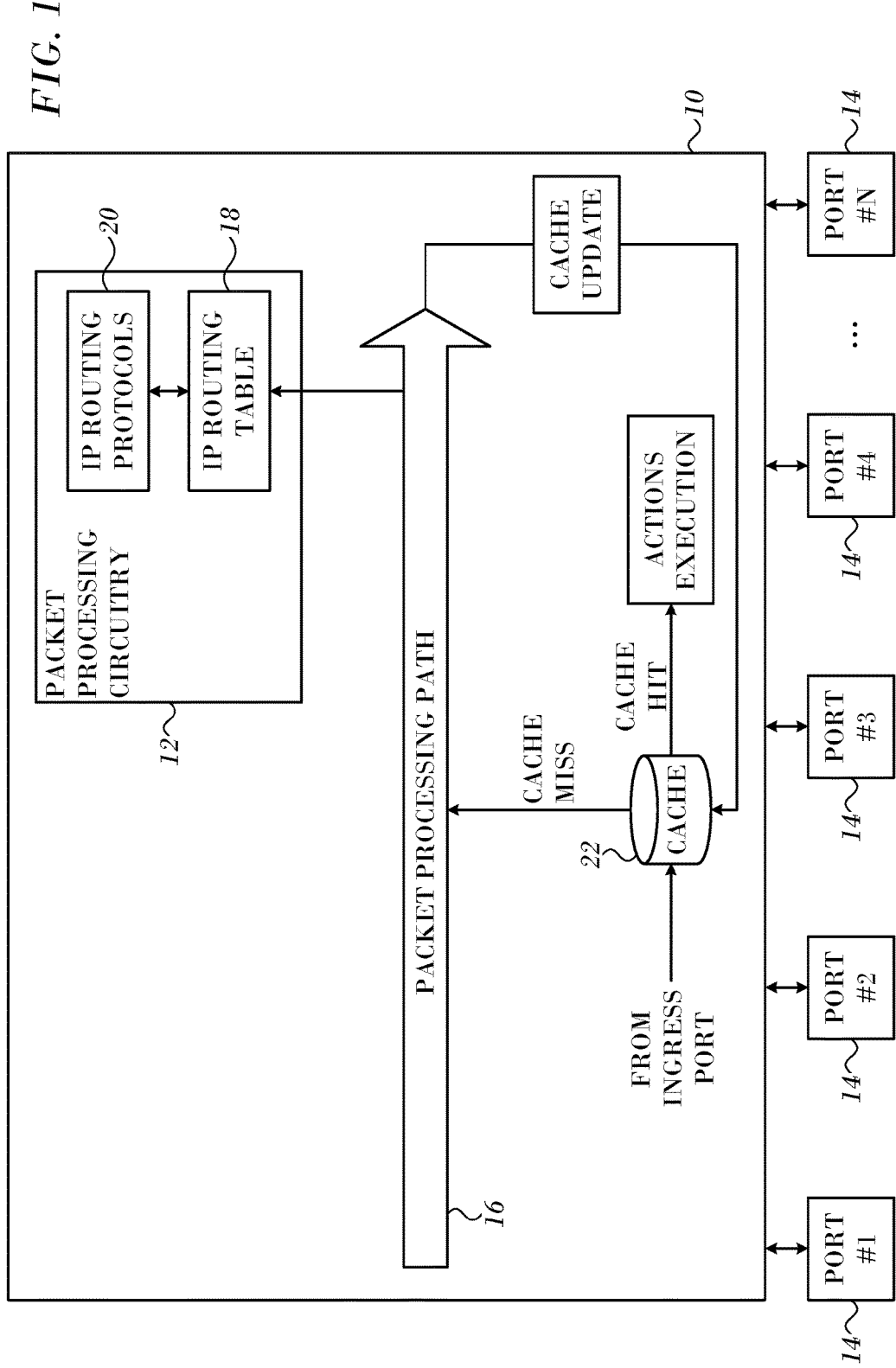
FIG. 1 is a block diagram of a network element in accordance with an embodiment of the invention.

Turning now to the drawings, reference is initially made to FIG. 1, which is a block diagram of a network element 10 in accordance with an embodiment of the invention. Network element 10 may comprise, for example, a network switch, a router or a network interface device such as a Network Interface Card (NIC) or Host Channel Adapter (HCA).

The network element 10 typically comprises packet processing circuitry 12, which may comprise a processor programmed with suitable software for coordinating and carrying out the functions described hereinbelow. Thus, although aspects of the network element 10 are shown in FIG. 1 and other figures hereof as comprising a number of separate functional blocks, these blocks are not necessarily separate physical entities, but rather could represent different computing tasks or data objects stored in a memory that is accessible to the processor. These tasks may be carried out in software running on a single processing element, or on multiple processors. The software may be embodied on any of a variety of known non-transitory media for use with a computer system, such as a diskette, or hard drive, or CD-ROM. The code may be distributed on such media, or may be distributed to the network element 10 from the memory or storage of another computer system (not shown) over a network. Alternatively or additionally, the tasks performed by packet processing circuitry 12 may be realized in hardware, such as a Field Programmable Gate Array or hard-wired logic.

Network element 10 may operate in any suitable communication network, and in accordance with any suitable communication protocol. Exemplary protocols may comprise Ethernet or InfiniBand.

Network element 10 comprises multiple ports 14, over which the network element receives input packets (also referred to as ingress packets) from a communication network and sends output packets (also referred to as egress packets) to the communication network. In a typical path or flow 16, packet processing circuitry 12 receives an input packet from one of ports 14 that is referred to as an ingress port, applies certain processing to the packet, and forwards the packet over one of ports 14 that is referred to as an egress port.

The network element 10 comprises a main database, IP routing table 18, which is used to obtain the DIP in order to forward the packet according to an IP routing protocol 20. DIPS are typically also stored in a cache 22 for efficiency.

To implement selection of an entry in the routing table 18 a binary search tree ordered by prefix lengths and based on hash table lookups is constructed from the routing table 18 as explained in the above-noted Waldvogel document. Markers are inserted on some nodes of the tree to ensure that the search leads to an existing entry at a longer length. The markers provide branching guidance for a search of the tree, indicating whether the longer or shorter subtree should be selected. The markers are similar to prefixes of an IP address, but lack associated information fields. Their presence or absence in a node is significant.

Figure 2:
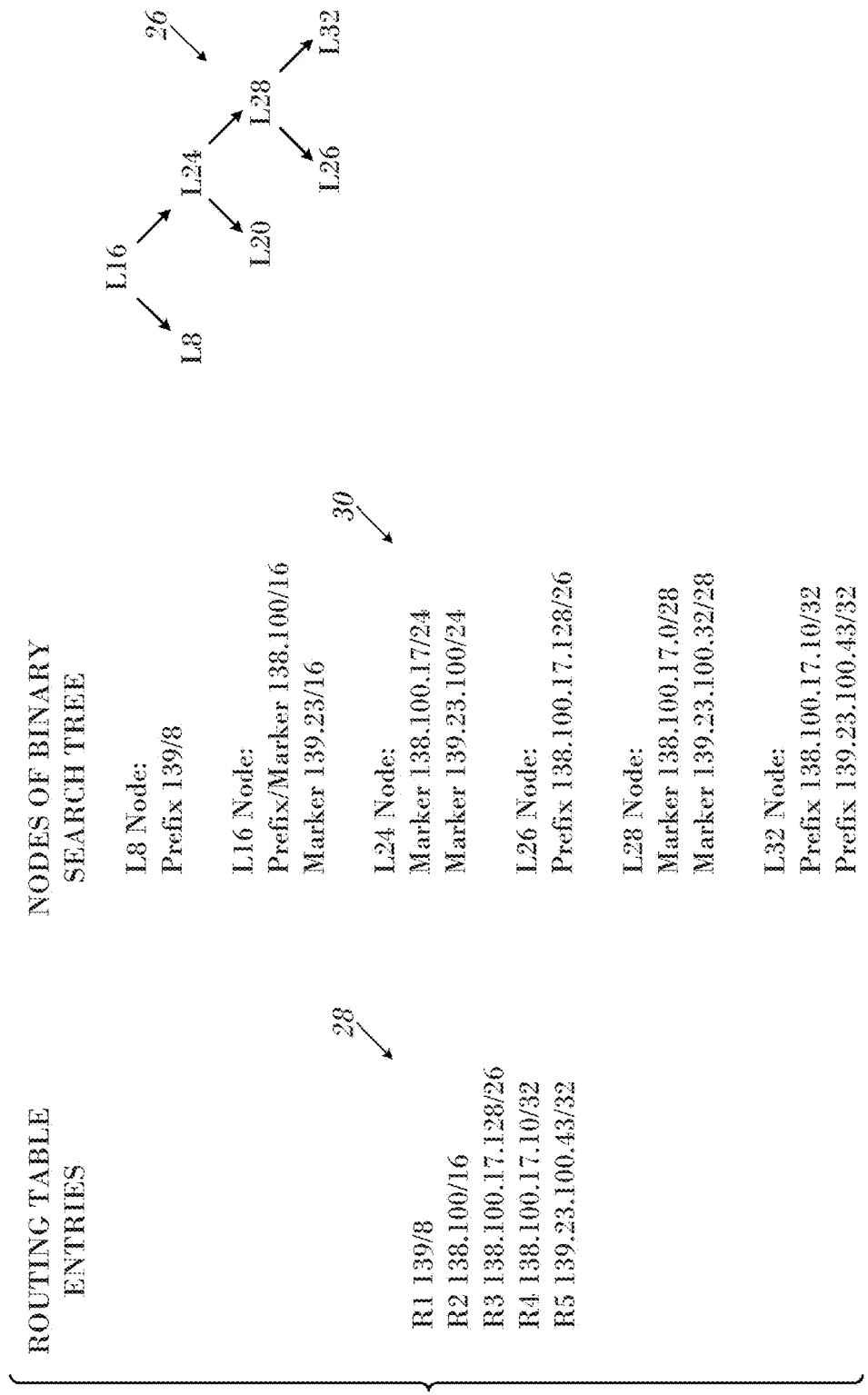
FIG. 2 is a diagram of a portion of a routing table and a corresponding binary search tree in accordance with the prior art.

Reference is now made to FIG. 2, which is a composite diagram of a portion of a routing table fragment 28 having entries R1 . . . R5, a corresponding binary search tree 26 in accordance with the prior art and a table 30 showing the contents of the nodes in the binary search tree 26. The nodes of the binary search tree 26 are annotated according to the length of the prefix therein. The search looks for an entry (prefix, prefix/marker or marker) matching the DIP on each node. If the node contains a prefix that is not designated to function as a marker, and that prefix matches the DIP, then the process ends. If a prefix/marker or a marker matches, then the search moves to the right. Otherwise the search moves to the left. The process ends in all cases when a leaf node is encountered.

The above-noted Waldvogel document indicates that to ensure that nodes containing the LPM are found, a signal, i.e., a marker is needed at certain nodes. The signal can be a marker when there is no prefix or a prefix/marker when a prefix exists:

A prefix describes a route in the search tree for which there are no compatible prefixes at longer lengths. Therefore on a match the search stops on that node.

A marker indicates that there are compatible prefixes at longer lengths. On a match with the marker the search continues in the right subtree to check if the DIP matches one of the compatible prefixes. The terms "right" and "left" are used arbitrarily herein to distinguish the two subtrees of a binary tree. These terms have no physical meanings with respect to the actual configuration of the binary tree.

A prefix/marker is an existing prefix that also functions as a marker. The prefix/marker forces the search to continue in order to find better prefix matches in lower levels of the tree. It will be recalled that a search that matches a prefix that is not a marker terminates at that node. However, in the case of a match with a prefix/marker the search continues in the right subtree.

A node other than a leaf node may contain more than one marker. The markers are constructed to direct searches according to the contents of the lower levels of the particular binary search tree. When a node is accessed in a search, all the markers in that node are examined to find a match, if any, and thus determine the direction of a further traversal of the tree.

When markers are added to the nodes of the binary search tree 26 as shown in table 30, tree traversals proceed as shown in the following examples:

EXAMPLE 1

A lookup for DIP 138.100.17.10 finds prefix/marker 138.100/16 at node L16 in a first memory access. The search proceeds in the right subtree. A second memory access at node L24 finds a match with marker 138.100.17/24. Accordingly, the right subtree is selected. In a third memory access at node L28 there is a match with marker 138.100.17.0/28. Again the right subtree is selected. In a fourth memory access at node L32 there is a match with the prefix 138.100.17.10/32. The search ends. The entry R4 in routing table fragment 28 (138.100.17.10/32) is used for further conventional processing of the packet.

EXAMPLE 2

Similarly a lookup for DIP 139.23.100.43 follows the same path as the preceding lookup, but relies on different markers. This lookup also requires four memory accesses. A first memory access at node L16 finds a match to marker 139.23/16. The search proceeds in the right subtree. A second memory access at node L24 finds a match with marker 139.23.100/24. Again the search moves to the right subtree. A third memory access at node L28 finds a match with marker 139.23.100.32/28. Once again the search moves to the right subtree. A fourth and final memory access at node L32 matches prefix 139.23.100.43/32. Node L32 is a leaf node. Here the search ends and entry R5 in routing table fragment 28 is used for further processing of the packet.

EXAMPLE 3

A lookup for DIP 138.100.17.143 in a first memory access to node L16 finds a match with prefix/marker 138.100/16. The search proceeds in the right subtree. A second memory access at node L24 matches marker 138.100.17/24. Again the search proceeds in the right subtree. A third memory access at node L28 finds no matches with either of the markers. Therefore, the left subtree of node L28 is selected.

In a fourth memory access at node L26 there is a match with the 26 MSB of prefix 138.100.17.128/26. This can be appreciated by a decimal-to-binary conversion of the DIP and the prefix, which is shown in Table 2. In the rightmost column, it will be apparent that when the 26 MSB of the DIP and prefix are unmasked, the left two bits of the binary representation in the rightmost column (10) as well as all the bits in the three left columns are common to both of them.

TABLE 2

| Bits | 1-8 | 9-16 | 17-24 | 25-32 |
|---|---|---|---|---|
| DIP (Decimal) | 138 | 100 | 17 | 143 |
| DIP (Binary) | 10001010 | 01100100 | 00010001 | 10001111 |
| Prefix (Decimal) | 138 | 100 | 17 | 128 |
| Prefix (Binary) | 10001010 | 01100100 | 00010001 | 10000000 |

The search ends, and entry R3 of the routing table fragment 28 (138.100.17.128/26) is reported for further processing of the packet.

EXAMPLE 4

A lookup for DIP 138.100.23.10 finds a match with prefix/marker at node L16 (138.100/16) in a first memory access, followed by a miss at node L24 in a second memory access. At a prefix length of 24 MSB, the DIP 138.100.23.10 and the marker 138.100.17/24 are not compatible. Consequently, the search proceeds in the left subtree of node L24. In a third memory access to node L20 there is a miss as there are no matching entries. The search ends. Entry R2 (138.100/16) is reported as the best matching prefix available in the routing table fragment 28.

BST Search with Jump Information.

Figure 3:
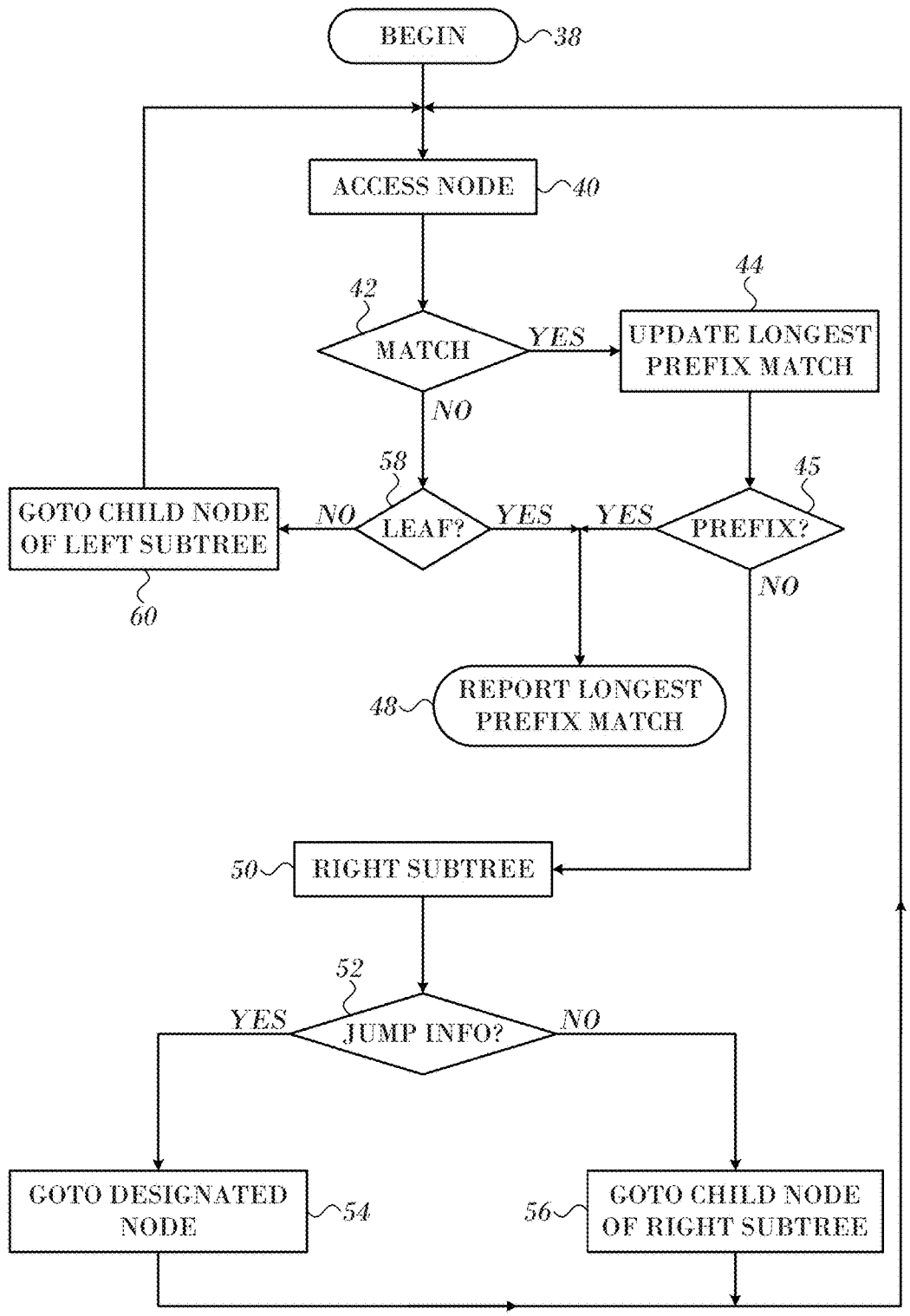
FIG. 3 is a flow chart of a method of traversing a binary search tree in accordance with an embodiment of the invention.

Reference is now made to FIG. 3, which is a flow chart of a method of traversing a binary search tree in accordance with an embodiment of the invention. In initial step 38 a binary search tree representing a routing table is established in a memory by known methods. Markers and jump information are placed in the nodes. The procedure for placement of jump markers is described below. Thus, nodes of the tree may include one or more of a marker, prefix/marker, jump marker, jump prefix/marker or a prefix (in the case of a leaf node). These possibilities are the subject of prefix comparisons in the steps that follow to in order determine the node of the tree corresponding to the longest prefix match with the DIP. For convenience the contents of the nodes are collectively referred to herein as "matchable prefix content". A packet having a DIP is received. A default value is set to be reported should the search of the tree not result in an improvement.

Next, at step 40 a memory access is performed, and a node of the tree is accessed. In the first performance of step 40 the node is the root node of the binary search tree.

Next, at decision step 42 it is determined if there is a match of compatibility in the current node between the DIP received in initial step 38 and matchable prefix content in the current node at a node-specific prefix length. Decision step 42 may require an iterative search among multiple instances of matchable prefix content. For example, a node may include any number of markers and any number of prefix/markers.

If the determination at decision step 42 is affirmative then at step 44 the best prefix match found thus far in the search is updated according to the match in decision step 42.

After performing step 44 at decision step 45, it is determined if the match is a prefix and the node has no prefix/marker. If the determination at decision step 45 is affirmative, then the search terminates at final step 48. The longest prefix match recorded in a performance of step 44 is reported, and the corresponding entry in the routing table used to process the packet.

If the determination at decision step 45 is negative, then control proceeds to step 50. The right subtree of the current node is selected for continuation of the search.

Next, at decision step 52, it is determined if the matchable prefix content of the current node contained jump information.

If the determination at decision step 52 is affirmative, then control proceeds to step 54. The destination of the next step in the search is set according to the destination in the jump information, skipping at least one intermediate level of the tree.

If the determination at decision step 52 is negative, then at step 56 the destination of the next step of the search is set at the child node in the right subtree of the current node. No levels of the tree are skipped.

After performing step 54 or step 56 control returns to step 40 to iterate the procedure.

If the determination at decision step 42 was negative, i.e., no matchable prefix content was found in the current node, then at decision step 58, it is determined if the current node is a leaf node. If the determination at decision step 58 is affirmative, then the search is over. Control proceeds to final step 48 and the longest prefix match so far recorded is reported.

If the determination at decision step 58 is negative, then control proceeds to step 60. The destination of the next step of the search is set at the child node in the left subtree of the current node. Control then returns to step 40 for another iteration.

Figure 4:
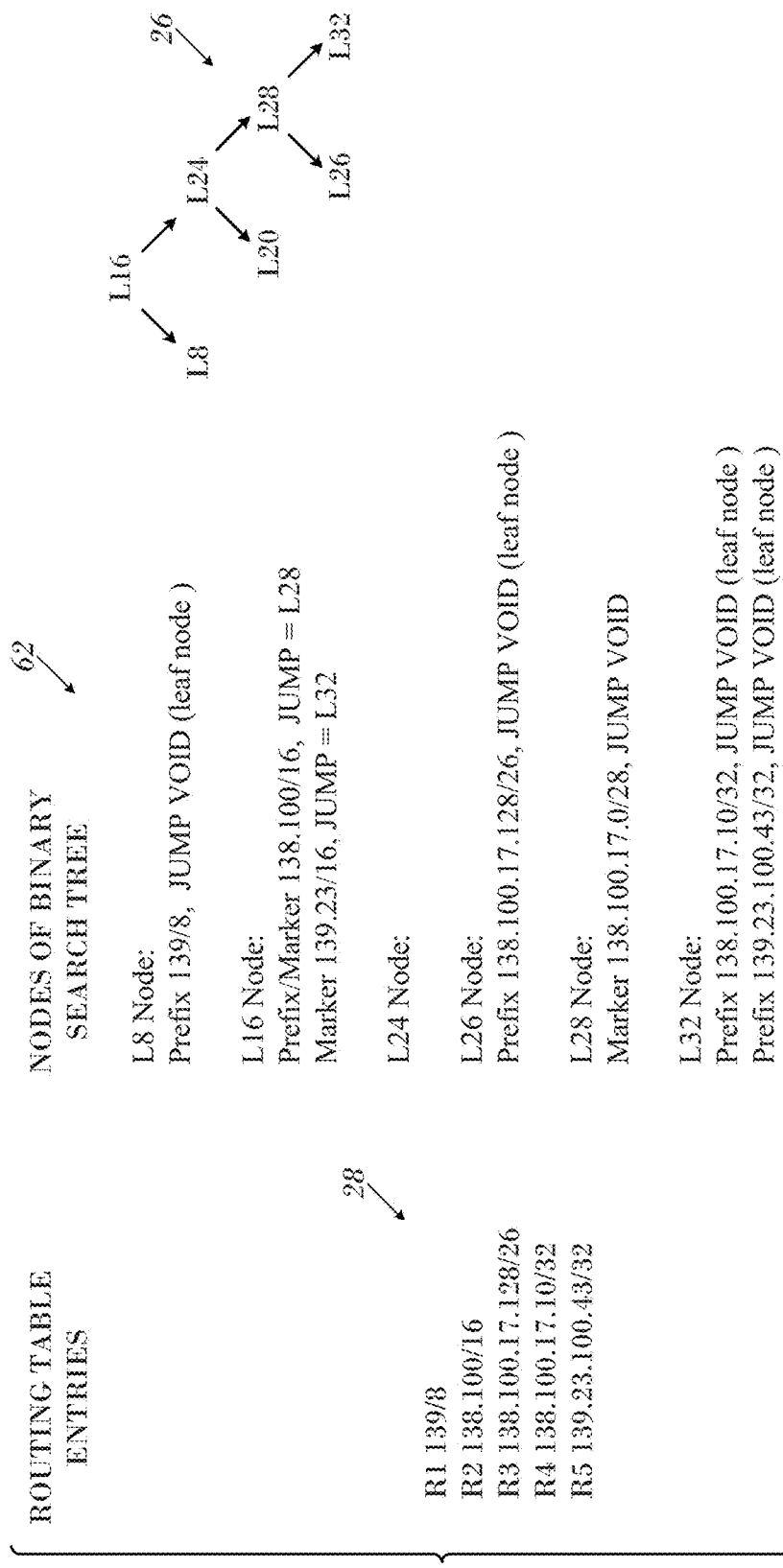
FIG. 4 is a diagram of a portion of a routing table and a corresponding binary search tree in accordance with an embodiment of the invention.

Reference is now made to FIG. 4, which is a diagram similar to FIG. 2, with modifications in the nodes of the binary search tree 26, in accordance with an embodiment of the invention. The table 30 is replaced by a new table 62 in which the markers and prefix/markers are modified to include jump information. Markers modified in this manner are referred to herein as "jump markers" or "jump prefix/markers" as the case may be in order to differentiate them from the markers in FIG. 2. These modified markers direct the search to continue at a node that is at least 2 levels below the current node, or in the case of leaf nodes, to terminate the search. The notations "JUMP VOID" and "JUMP VOID (leaf node)" associated with matchable prefix content indicates that there is no associated jump information. Compared with the table 30 (FIG. 2) in the table 62 the number of markers (or other items containing matchable prefix content) are reduced. In the table 62 there are no matchable prefix content for the node L24, and the node L28 has one item instead of two. Reduction of the amount of data in the binary search tree is one advantage of the arrangement of FIG. 4 compared to that of FIG. 2.

The following examples are counterparts of Examples 1-4, but are performed according to the method of FIG. 3.

EXAMPLE 5

The lookup is for DIP 138.100.17.10. The tree traversal in this lookup search differs from the lookup for the same DIP in Example 1, in that levels of the tree can be skipped entirely by exploiting the jump markers. In a first memory access at node L16 there is a match with the jump prefix/marker 138.100/16. Accordingly, the right branch is selected; however the jump prefix/marker directs the tree traversal to proceed directly to node L28, skipping node L24 entirely.

In a second memory access at node L28, there is a match with jump marker 138.100.17/28, The indication JUMP VOID indicates that there is no jump instruction, and the search is to proceed in the manner described in Example 1. Accordingly, the right subtree of node L28 is selected, and in a third memory access at node L32, a match with prefix 138.100.17.10/32 is found. The lookup ends and entry R4 (138.100.17.10/32) is reported as in Example 1. However only three memory accesses were required instead of four as in Example 1.

EXAMPLE 6

The lookup is for DIP 139.23.100.43. It will be recalled that this lookup was performed in Example 2. In the embodiment of FIG. 4 a first memory access to node L16 finds a match at jump prefix/marker 139.23/16. The jump information in this jump prefix/marker directs the search to proceed to node L32, skipping two levels of the tree (nodes L24 and L28).

In a second memory access at node L32 there is a match with Prefix 139.23.100.43/32. This is a leaf node and there is no jump information. As in Example 2 the search ends and entry R5 in routing table fragment 28 is used for further processing of the packet. However, only two memory accesses were needed compared with four memory accesses in Example 2.

EXAMPLE 7

The lookup is for DIP 138.100.17.143. It will be recalled that this lookup was performed in Example 3. In the embodiment of FIG. 4 a first memory access to node L16 finds a match at jump prefix/marker 138.100/16. The jump information in this jump prefix/marker directs the search to proceed to node L28. As in FIG. 3 there is a miss at node L28. Therefore, the left subtree of node L28 is selected. In a third memory access at node L26 there is a match with the 26 MSB of prefix 138.100.17.128/26. The search ends, and entry R3 of the routing table fragment 28 (138.100.17.128/26) is reported for further processing of the packet. While the search in Example 3 required four memory accesses, this example requires only three.

EXAMPLE 8

The lookup is for DIP 138.100.23.10. It will be recalled that this lookup was performed in Example 4. The search finds a match with jump prefix/marker 138.100/16 at node L16 in a first memory access, The jump information directs the search to continue two levels beyond node L16 at node L28 in a second memory access, skipping the intermediate level containing node L24. There are no matches at node L28. Consequently the search continues in the left subtree of node L28. A third memory access at node L26 results in a miss. The search ends. Entry R2 is reported as the best matching prefix available in the routing table fragment 28. The embodiments of FIG. 2 and FIG. 4 both require three memory accesses.

In comparing Examples 1-4 with their counterparts in Examples 5-8, the number of memory accesses has been reduced in three of the four cases when the embodiment of FIG. 4 is employed.

Figure 5:
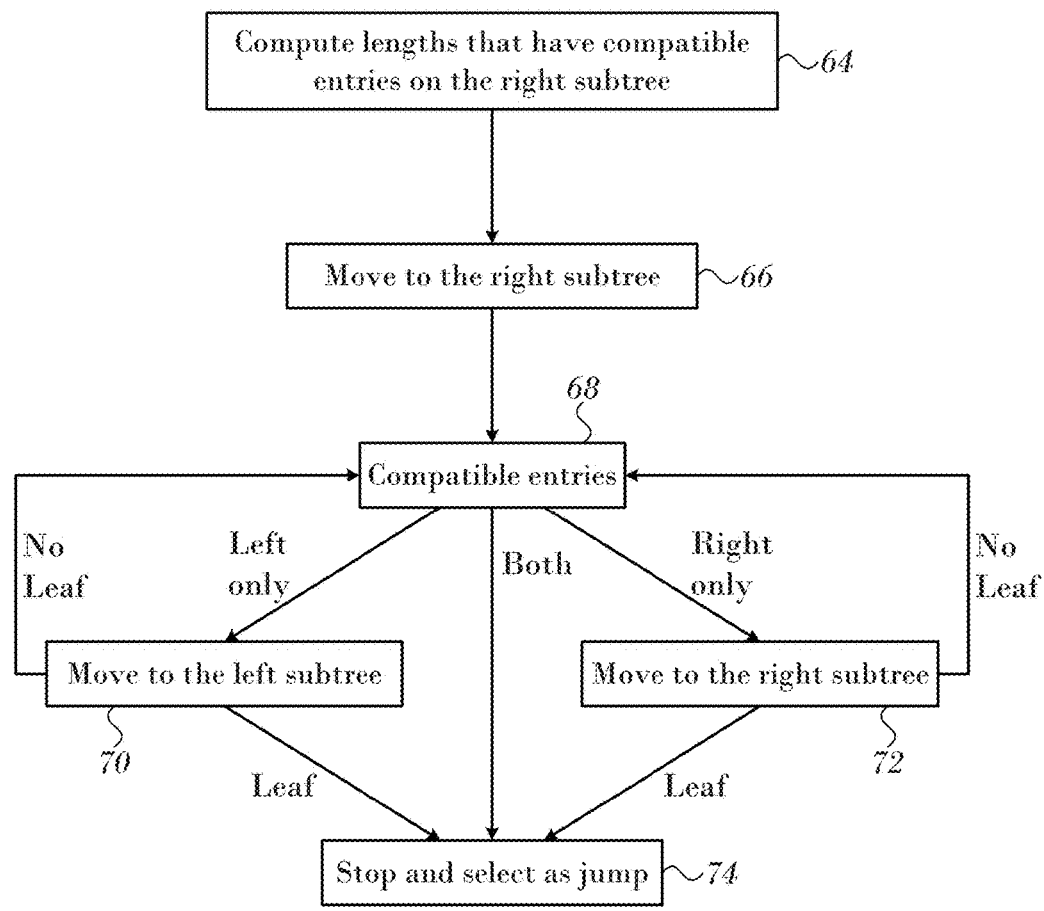
FIG. 5 is a flow chart of a method for determining a destination of a jump in a binary search tree in accordance with an embodiment of the invention.

Reference is now made to FIG. 5, which is a flow chart of a method for determining for a given entry, the destination of a jump from a current node of a binary search tree in accordance with an embodiment of the invention. At initial step 64 the prefix lengths of compatible entries to the entry for which the jump is being computed are identified in the right subtree of the current node. The strategy of the search for the destination node is to traverse the right subtree of the current node. When a node is reached that has compatible entries in both its right and left subtrees, then that node becomes the destination node for the jump.

At step 66 the search moves to the first child node of the right subtree. The current node is evaluated for the presence of compatible entries at decision step 68. There are three possibilities:

(1) Compatible entries are found in the left subtree but not in the right subtree. The search moves to the first child in the left subtree at step 70.

(2) Compatible entries are found in the right subtree but not in the left subtree. The search moves to the first child in the right subtree at step 72.

(3) Compatible entries are found both in the right and the left subtrees. In this case at final step 74 the current node is selected as the destination for the jump and the procedure ends.

At step 70 or step 72 (according to the selection in decision step 68) a determination is made if the grandchild node in the respective left and right subtree of the child node is a leaf node. If the selected grandchild node is a leaf node, then that grandchild node is selected as the destination for the jump at final step 74. If the tests at step 70, 72 indicate that neither of the grandchild nodes is a leaf node, then control returns to decision step 68 to iterate at the next lower level of the binary search tree.

When a traversal of a binary search tree uses the jumps that are established using the procedure of FIG. 5, the number of memory accesses for a lookup that uses the jump is reduced. This has been evaluated by simulation and shown to reduce 0.84 memory accesses on average for real Internet routing tables using different traffic models. The reduction is approximately 20% of the accesses needed to complete a lookup (The total is around 4 for a balanced tree, depending on the traffic model). The reduction is achieved when one compatible prefix length is involved. Larger gains are expected in a more elaborate arrangement that implements jumps when there is more than one compatible prefix length is used.

The cost of implementing a jump is a few bits per entry to code the jump (maximum of five bits for IPv4 and seven for IPv6) and a small increase in complexity in the insertions, removals and search operations. The hardware required to establish the tree is conventional, and does not need to change; except in the case when the jump value is different from zero. Then the movement to the right is taken from the jump value rather than from the tree structure.

To add an entry to the tree when a jump is used, a search for compatible entries at shorter lengths is conducted. For such entries the jump information is updated using the procedure described above with respect to FIG. 5. The same procedure can be used to insert markers when needed. During the process of updating the tree, packets may follow the old route until all the entries have been updated. After the removal of an entry, a similar procedure needs to be applied to the compatible entries at shorter lengths. However in this case, the packets will follow the correct routes during the updating process. This is so because removing a route cannot make jumps longer and using shorter jumps will still cause the correct route to be followed, (although requiring a larger number of memory accesses).

Alternate Embodiments.

One option to reduce complexity is to limit the jump to cases in which there is only one node having a compatible prefix length, so that the jump is direct to that node. Referring again to FIG. 2, this would apply, for example, to a lookup on DIP 139.23.100.43/32. In that case, the marker at node L16 only has one compatible entry at node L32. This has been found to be the case for a large percentage (up to 80%) of the entries in Internet routing tables.

In such a case, when adding an entry we search for compatible entries at shorter prefix lengths and for such entries remove the jump if the jump information is different from the prefix length being added. Otherwise there would be at least two compatible prefix lengths in the tree. On the other hand if no current jump exists, i.e., the jump information is empty, it is determined whether there are other compatible entries at other prefix lengths. If not, it is concluded that the new entry is the only compatible entry, and its length is added as the jump information for the new entry.

To set the jump on a new entry we search for compatible rules that are longer and if we only find one such prefix length we use that as the jump. Removing an entry is similar and in this case, we only need to check compatible shorter entries that have no jump and see if they have only one compatible length and in that case, revise the jump information.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method comprising:
   representing a routing table for a data network as a binary search tree of address prefixes ordered by prefix lengths, the binary search tree having a root node and two subtrees of nodes including parent nodes and descendant nodes disposed in hierarchical levels of the subtrees, the descendant nodes comprising leaf nodes;
   placing respective markers in the parent nodes to guide accessing the descendant nodes in the subtrees to search for a destination address of a data packet;
   associating destination descendant nodes with the markers, the destination descendant nodes being separated from the parent nodes by at least one intermediate hierarchical level;
   traversing the binary search tree in a direction from the root node to the leaf nodes to determine a longest prefix match between the markers and the destination address, wherein traversing the binary search tree comprises accessing the respective destination descendant nodes while avoiding accessing the descendant nodes of the at least one intermediate hierarchical level; and
   processing the data packet in the data network in accordance with an entry in the routing table that corresponds to the longest prefix match, wherein associating destination descendant nodes comprises:
   making a first determination that compatible descendant nodes in a selected subtree comprise address prefixes that are compatible with the marker of one of the parent nodes;
   making a second determination that one of the compatible descendant nodes is a leaf node or has additional compatible descendant nodes; and
   responsively to the second determination assigning the one compatible descendant node as the destination descendant node.

2. The method according to claim 1, wherein traversing the binary search tree comprises accessing one of the subtrees of the nodes when markers are present and accessing another of the subtrees of the nodes when the markers are absent.

3. The method according to claim 1, wherein accessing the destination descendant nodes comprises performing hash lookups.

4. The method according to claim 1, wherein associating destination descendant nodes comprises:
   making a first determination that compatible descendant nodes in a selected subtree comprise address prefixes are compatible with the marker of one of the parent nodes; and
   making a second determination that one of the compatible descendant nodes is a compatible leaf node; and
   responsively to the second determination assigning the compatible leaf node as the destination descendant node.

5. The method according to claim 1, wherein the markers in the nodes comprise an indication that longer compatible prefixes exist in one of the subtrees thereof.

6. The method according to claim 1, wherein the markers in the nodes comprise an indication that no longer compatible prefixes exist in one of the subtrees thereof.

7. The method according to claim 1, wherein at least a portion of the nodes comprise a plurality of markers.

8. An apparatus, comprising:
   a network element, operative for receiving via a data network a packet having a destination address;
   a processor in the network element;
   a main memory storing a routing table of packet forwarding information, wherein the processor is operative for performing the steps of:
   representing the routing table as a binary search tree of address prefixes ordered by prefix lengths, the binary search tree having a root node and two subtrees of nodes including parent nodes and descendant nodes disposed in hierarchical levels of the subtrees, the descendant nodes comprising leaf nodes;
   placing respective markers in the parent nodes to guide accessing the descendant nodes in the subtrees to search for the destination address of the packet;
   associating destination descendant nodes with the markers, the destination descendant nodes being separated from the parent nodes by at least one intermediate hierarchical level;
   traversing the binary search tree in a direction from the root node to the leaf nodes to determine a longest prefix match between the markers and the destination address, wherein traversing the binary search tree comprises accessing the respective destination descendant nodes while avoiding accessing the descendant nodes of the at least one intermediate hierarchical level; and
   processing the packet in the data network in accordance with an entry in the routing table that corresponds to the longest prefix match, wherein associating destination descendant nodes comprises:

making a first determination that compatible descendant nodes in a selected subtree comprise address prefixes that are compatible with the marker of one of the parent nodes;

making a second determination that one of the compatible descendant nodes is a leaf node or has additional compatible descendant nodes; and responsively to the second determination assigning the one compatible descendant node as the destination descendant node.

9. The apparatus according to claim 8, wherein traversing the binary search tree comprises accessing one of the subtrees of the nodes when markers are present and accessing another of the subtrees of the nodes when the markers are absent.

10. The apparatus according to claim 8, wherein accessing the destination descendant nodes comprises performing hash lookups.

11. The apparatus according to claim 8, wherein associating destination descendant nodes comprises:

making a first determination that compatible descendant nodes in a selected subtree comprise address prefixes are compatible with the marker of one of the parent nodes; and making a second determination that one of the compatible descendant nodes is a compatible leaf node; and responsively to the second determination assigning the compatible leaf node as the destination descendant node.

12. The apparatus according to claim 8, wherein the markers in the nodes comprise an indication that longer compatible prefixes exist in one of the subtrees thereof.

13. The apparatus according to claim 8, wherein the markers in the nodes comprise an indication that no longer compatible prefixes exist in one of the subtrees thereof.

14. The apparatus according to claim 8, wherein at least a portion of the nodes comprise a plurality of markers.

15. A non-transitory computer-readable storage medium in which computer program instructions are stored, which instructions, when executed by a computer, cause the computer to perform the steps of:

representing a routing table for a data network as a binary search tree of address prefixes ordered by prefix lengths, the binary search tree having a root node and two subtrees of nodes including parent nodes and descendant nodes disposed in hierarchical levels of the subtrees, the descendant nodes comprising leaf nodes;

placing respective markers in the parent nodes to guide accessing the descendant nodes in the subtrees to search for a destination address of a data packet;

associating destination descendant nodes with the markers, the destination descendant nodes being separated from the parent nodes by at least one intermediate hierarchical level;

traversing the binary search tree in a direction from the root node to the leaf nodes to determine a longest prefix match between the markers and the destination address, wherein traversing the binary search tree comprises accessing the respective destination descendant nodes while avoiding accessing the descendant nodes of the at least one intermediate hierarchical level; and processing the data packet in the data network in accordance with an entry in the routing table that corresponds to the longest prefix match, wherein associating destination descendant nodes comprises:

making a first determination that compatible descendant nodes in a selected subtree comprise address prefixes that are compatible with the marker of one of the parent nodes;

making a second determination that one of the compatible descendant nodes is a leaf node or has additional compatible descendant nodes; and responsively to the second determination assigning the one compatible descendant node as the destination descendant node.

16. The computer software product according to claim 15, wherein traversing the binary search tree comprises accessing one of the subtrees of the nodes when markers are present and accessing another of the subtrees of the nodes when the markers are absent.

17. The computer software product according to claim 15, wherein associating destination descendant nodes comprises:

making a first determination that compatible descendant nodes in a selected subtree comprise address prefixes are compatible with the marker of one of the parent nodes; and making a second determination that one of the compatible descendant nodes is a compatible leaf node; and responsively to the second determination assigning the compatible leaf node as the destination descendant node.

* * * * *